3,232,947
PREPARATION OF FLUORINATED
ARYL HALIDES
Robert N. Haszeldine, Windyridge, Lyme Road, Disley, England; Alan R. Parkinson, 25 High View St., Bolton, England; and John M. Birchall, 22 Lorna Road, Cheadle Hulme, England
No Drawing. Filed Sept. 12, 1962, Ser. No. 223,265
Claims priority, application Great Britain, Sept. 18, 1961, 33,384/61
9 Claims. (Cl. 260—290)

This invention relates to a method for preparing polyfluorinated aryl halides by reaction of polyfluoroarylhydrazines with alkyl halides in the presence of an oxidizing agent.

This new method may be exemplified by the reaction of pentafluorophenylhydrazine with methyl iodide in the presence of an oxidizing agent in accordance with the following:

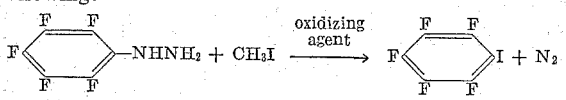

While this invention is not limited to, and does not depend upon, any particular mechanism, it is believed that the reactions of the invention proceed through the formation of an intermediate transient diazo compound, e.g. $C_6F_5N=NH$, prepared by the oxidation of the polyfluoroarylhydrazine which in turn undergoes homolytic decomposition to produce a polyfluoroaryl free radical with the evolution of nitrogen. The free radical thus formed then attacks the alkyl halide with the abstraction of halogen to form the desired polyfluoroaryl halide. The foregoing reaction mechanism may be exemplified by the oxidation of pentafluorophenylhydrazine in the presence of methyl iodide:

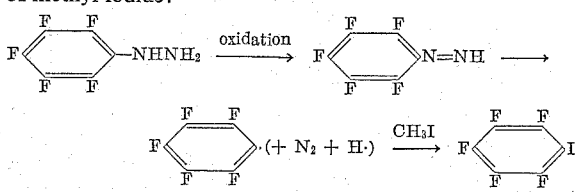

The present invention provides an improved route to polyfluoroaryl halides, for example pentafluorophenyl bromide, pentafluorophenyl iodide or tetrafluorophenyl iodide. Previously, such compounds have been prepared by the direct halogenation of partially fluorinated aromatics, such as by the iodination or bromination of pentafluoro or tetrafluorobenzene. This prior procedure has the disadvantage that the partially fluorinated aromatic precursor (e.g. pentafluorobenzene) is generally prepared from the fully fluorinated compound (e.g. hexafluorobenzene) in relatively poor yield. In accordance with the invention, the precursor hydrazine is readily prepared in high yields from the perfluorinated or polyfluorinated aromatic, and the hydrazine group is readily replaced by halogen in accordance with the invention in good to excellent yields.

The polyfluorinated aryl hydrazines useful as starting materials in the present invention may be represented by the general formula:

where R is an aromatic radical attached to the hydrazine group through an aromatic ring carbon atom and carrying fluorine on at least half and preferably on at least two-thirds of its aromatic ring positions or a tetrafluoropyridyl group attached to the hydrazine group through a pyridyl ring carbon atom. The term aromatic radical is understood in the usual sense as one containing a six-membered carbocyclic ring having three conjugated double bonds. The radical R may be mononuclear, e.g. pentafluorophenyl or tetrafluorophenyl, or may contain two or more aromatic rings which may be of the condensed type as e.g. perfluoronaphthyl, perfluoroanthracenyl or perfluorophenanthryl, or may contain two or more coupled aromatic rings such as in a perfluorinated diphenyl radical or a perfluorinated diphenylmethane radical. In addition to fluorine, the aromatic ring may also contain other substituents such as alkyl, haloalkyl, halogen, particularly chlorine and bromine, aryl, nitro, alkoxy or phenoxy substituents.

The preferred polyfluorinated aryl hydrazines are those in which the radical R contains from 6 to 20 and most desirably from 6 to 12 carbon atoms and those which, in addition to carbon and fluorine, contain only hydrogen atoms in the R radical. Particularly desirable are the perfluorinated aryl hydrazines, including those containing perfluoroalkyl substituents, such as pentafluorophenylhydrazine, heptafluoronaphthylhydrazine, nonafluorodiphenylhydrazine, perfluoromethyltetrafluorophenylhydrazine, bis(perfluoromethyl)trifluorophenylhydrazine and the like.

Typical fluorinated aryl hydrazines useful in the process of the invention are the following: trifluorophenylhydrazine; tetrafluorophenylhydrazine; pentafluorophenylhydrazine; methyltetrafluorophenylhydrazine; perfluorotolylhydrazine; heptafluoronaphthylhydrazine; nonafluorodiphenylhydrazine; tetrafluoropyridylhydrazine.

The fluorinated aryl hydrazine starting material may be readily prepared by reaction of the corresponding fluorinated aryl compound e.g. hexafluorobenzene, with hydrazine hydrate in an organic solvent such as ethanol or dioxane. The preparation of the hydrazine is preferably carried out in a cyclic ether solvent such as dioxane since it has been found that such solvents provide almost quantitative yields of a desired fluorinated aryl hydrazine such as pentafluorophenylhydrazine. The fluorinated aryl hydrazines are generally crystalline solids.

The alkyl halide contributing the halogen atom may be represented by the general formula R'—X where X is chlorine, bromine or iodine and where R' is an alkyl (including cycloalkyl) radical, or a haloalkyl (including cyclohaloalkyl) radical. The radical R' may be straight chain or branched and the halogen atom X may be attached to a primary, secondary or tertiary carbon atom.

Preferably, the alkyl halide contains not more than about 10 carbon atoms and in most cases alkyl halides containing from one to six and most desirably from one to three carbon atoms are preferred.

The invention is particularly suited for the production of polyfluoroaryl iodides by reaction of the polyfluoroarylhydrazine with an alkyl iodide. In general, the reaction with the alkyl iodide proceeds most readily and in the highest yields.

In the case of the alkyl bromides the radical R' is preferably haloalkyl and most desirably, the alkyl bromide is one in which two or more bromine atoms are carried on the same carbon atom as in e.g. $CF_2Br_2$, $CHBr_3$ or $CFBr_3$. Similarly, the preferred alkyl chlorides are those in which R' is haloalkyl, particularly those in which two or more chlorine atoms are carried on the same carbon atom as in $CFCl_3$, $CCl_4$, $C_2Cl_6$ or $CCl_3CCl_2CCl_3$.

Typical iodides useful in the present invention include e.g. $CH_3I$; $C_2H_5I$; $CH_2I_2$; $CHI_3$; $CFCl_2I$; $CF_2ClCCl_2I$; $CF_2ClCFClI$; $C_6H_{11}I$; $CF_3I$; $CF_3CFICF_3$; and $C_5F_{11}I$. Typical alkyl bromides include $CFBr_3$; $CF_2Br_2$; $CCl_3Br$; $CF_2ClBr$; $CH_2ClBr$; $CH_2Br_2$; $CHBr_3;CBr_4$; $CF_2BrCFClBr$ and $CH_2BrCH_2Br$. Typical alkyl chlorides include e.g. $CHCl_3$; $CCl_4$; $CF_2ClCCl_2CCl_3$ and $C_2Cl_6$.

In general the reaction may be carried out at temperatures ranging from about −30° to about 180° C. and preferably at temperatures from about −10° to about 120° C. At temperatures about 120° C. there is a greater tendency for side reactions to occur with consequent reduced yields, and accordingly, temperatures below about 120° C. are preferred. Reaction pressure is not critical and the reaction is carried out most conveniently at atmospheric pressure although reduced or elevated pressures may be employed if desired. The mole ratios of the reactants are not critical although it will be generally preferred to employ at least a molar excess of the alkyl halide to assure high conversions of the fluorinated aryl hydrazine. Reaction time is likewise not critical, reaction periods of from one-half to ten hours generally being sufficient to provide good conversion.

A wide variety of oxidizing agents may be employed including, for example, heavy metal oxides such as silver oxide, mercury oxide and lead dioxide; oxidizing agents of the positive halogen type, such as bleaching powder [$CaOCl_2$], chloramine-T (sodium para - toluenesulfonchloramine) and the hypochlorites, hypobromites and hypoiodites of alkali metals (particularly sodium and potassium) or of the alkaline earths (particularly calcium); oxidizing agents containing oxidizing anions such as permanganates, dichromates, bismuthates, vanadates, chlorates, bromates and iodates; compounds containing higher oxidation states of polyvalent transition metals such as compounds containing the cupric, ferric and ceric ion; air or oxygen, either alone or in the presence of a catalyst such as a cupric compound; peroxides and peracids, such as hydrogen peroxide, and peracetic acid or oxidizing acids such as nitric acid; or oxidants such as elemental chlorine, or organic oxidizing agents such as quinones.

The reaction may in most cases be conveniently carried out by adding the solid polyfluorinatd arylhydrazine to an agitated mixture of the alkyl halide and oxidizing agent. The reaction is in many cases exothermic and it may be necessary to cool the reaction mixture, e.g. by means of an ice bath, to regulate the reaction and control the rate of oxidation. Nitrogen is evolved, often quantitatively, by oxidation of the polyfluorinated arylhydrazine. After the evolution of nitrogen ceases, it is generally desirable to raise the reaction temperature to insure completeness of reaction. The hydrazine will generally be sufficiently soluble in the alkyl halide and accordingly an extraneous solvent will generally not be necessary. Where a solvent is employed, it should be relatively inert (i.e. one which is not appreciably attacked by either of the reactants) such as a hydrocarbon solvent e.g. cyclohexane or hexane. In most cases it is preferred to conduct the reaction under substantially anhydrous conditions, since in the presence of water by-products such as pentafluorobenzene and/or tetrafluorobenzene (in the case of pentafluorophenylhydrazine) tend to be produced. However the use of aqueous oxidizing agents is not excluded. When such oxidizing agents are used, the polyfluorophenylhydrazine and the alkyl halide are preferably shaken vigorously with the aqueous medium to insure adequate contact between the alkyl halide and the attacking polyfluoroaryl radicals.

In general, the alkyl iodides are the most reactive (i.e. iodine is abstracted most readily by the polyfluoroaryl radical to produce the desired polyfluoroaryl iodide), while the alkyl bromides are of intermediate reactivity and the alkyl chlorides of the lowest relative activity. Accordingly, when an alkyl halide is employed containing both iodine and bromine or both iodine and chlorine, or iodine, bromine and chlorine, the iodine atom will generally preferentially react to produce the polyfluoroaryl iodide. When the alkyl halide contains both bromine and chlorine, the bromine atom will generally preferentially react to form the polyfluoroaryl bromide.

The following examples are intended to illustrate the invention.

*Example 1.—Preparation of pentafluorophenylhydrazine*

Hexafluorobenzene (20.0 g., 0.11 mole), 100% hydrazine hydrate (12.5 g., 0.25 mole) and dioxane (150 ml.) are heated under reflux for four hours. The bulk of the solvent is removed by distillation and hexafluorobenzene (2.0 g., 10%) is recovered from the distillate by the addition of water (50 ml.) and steam-distillation. Water (100 ml.) is added to the residue, and the white precipitate is filtered off, washed with water, and dried in a vacuum desiccator to give almost pure pentafluorophenylhydrazine (14.5 g.), M.P. 75.5–76.5° C. Ether extraction of the aqueous filtrate yields a further quantity (4.1 g) of the hydrazine, bringing the total yield to 18.6 g. (97% based on hexafluorobenzene transformed). Recrystallization of the combined product from a light petroleum fraction (B.P. 60–80° C.) gives pure pentafluorophenylhydrazine (18.1 g., 94% based on hexafluorobenzene transformed), M.P. 76–77° C. identified by infrared spectroscopy and comparison with an authentic specimen.

*Example 2.—Preparation of pentafluorophenyl iodide*

To a flask equipped with a reflux condenser and stirrer there is introduced 150 milliliters of methyl iodide and 24 grams of silver oxide. To this mixture, while vigorously stirring, there is added over a period of two hours 13.6 grams (0.069 mole) of pentafluorophenylhydrazine. After a short induction period, a vigorous reaction ensues which is controlled by cooling in ice. During the reaction nitrogen is evolved almost quantitatively (1520 milliliters, 98%). When the addition of the pentafluorophenylhydrazine is complete, the mixture is refluxed for 30 minutes, then filtered and dried over anhydrous magnesium sulfate. Upon distillation of the liquid product there is obtained 11.7 grams (60% yield) of chromatographically pure pentafluorophenyl iodide boiling at 107° C. at 150 mm. Hg and identified by comparison with an authentic specimen. There is also obtained from this reaction small amounts of pentafluorobenzene (7% yield) and 2,3,4,5,6-pentafluorotoluene.

*Example 3.—Preparation of pentafluorophenyl bromide*

To a flask equipped with a reflux condenser and stirrer there is introduced 150 milliliters of dibromodifluoromethane and 17.6 grams of silver oxide. While vigorously stirring, there is added to this mixture 10 grams (0.05 mole) of pentafluorophenylhydrazine over a period of 1½ hours while maintaining the reaction temperatture at approximately 0° C., after which the mixture is heated under reflux for a further 30 minutes. Nitrogen (840 milliliters, 74%) is evolved during the reaction. The resulting solution is filtered, dried over anhydrous magnesium sulfate and distilled. There is obtained 3.1 grams (25% yield) of pentafluorophenyl bromide

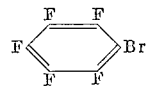

boiling at approximately 135° C. identified by infrared spectroscopy and by comparison with an authentic specimen prepared by bromination of pentafluorobenzene.

*Example 4.—Preparation of 4-methyl-2,3,5,6-tetrafluorophenyl iodide*

Into a flask equipped with a stirrer and reflux condenser there is introduced 100 milliliters of $CH_3I$ and 20 grams of silver oxide. To this mixture, while vigorously stirring, there is gradually added 4-methyl-2,3,5,6-tetrafluorophenylhydrazine while maintaining a temperature of 0°–20° C. The reaction mixture is then warmed to reflux for an additional hour. The mixture is filtered, the filtrate is dried and distilled and there is obtained a good yield of 4-methyltetrafluorophenyl iodide

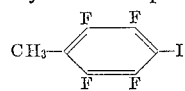

*Example 5.—Preparation of pentafluorophenylbromide*

Following the procedures of the previous examples, 10 grams (0.0505 mole) of pentafluorophenylhydrazine is added to a stirred suspension of 100 milliliters of bromoform and 18 grams of silver oxide over a period of 2 hours while maintaining a temperature of from about 10 to 20° C. After heating the mixture at 80–100° C. for an additional 2 hours, the liquid products are purified giving a good yield of pentafluorophenyl bromide.

*Example 6.—Preparation of heptafluoronaphthyl iodide*

Following the procedures of the previous examples, heptafluoronaphthylhydrazine is added to a vigorously stirred suspension of a 50% excess of silver oxide in a 300% excess of methyl iodide while maintaining a temperature of 0° C. after which the mixture is heated to reflux for an additional 2 hours. After filtering off the product and recrystallization, there is obtained a good yield of heptafluoronaphthyl iodide, $C_{10}F_7I$.

*Example 7.—Preparation of pentafluorophenyl chloride*

Pentafluorophenylhydrazine is added slowly to a vigorously shaken suspension of silver oxide (100% excess) in carbon tetrachloride (1000% excess) while maintaining the temperature at 10° C. After heating to reflux for three hours while maintaining the vigorous shaking, the liquid product is purified giving pentafluorophenyl chloride in moderate yield.

*Example 8.—Preparation of 2,3,5,6-tetrafluorophenyl iodide*

Following the procedures of the previous examples 10 grams of 2,3,5,6-tetrafluorophenylhydrazine is added to a vigorously stirred suspension of 25 grams of bleaching powder [$CaOCl_2$] in 100 milliliters of $CF_2ClCFClI$ kept in the dark and while maintaining a reaction temperature of 0° to 20° C. after which the mixture is heated to reflux for an additional hour. After filtering and drying over anhydrous magnesium sulfate, the liquid product is distilled to give a good yield of 2,3,5,6-tetrafluorophenyl iodide

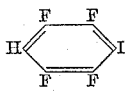

*Example 9.—Preparation of tetrafluoro-4-iodopyridine*

Following the procedure of the previous examples, 4-hydrazinotetrafluoropyridine is added gradually to a vigorously stirred suspension of a 50% excess of bleaching powder [$CaOCl_2$] in a 5 molar excess of isopropyl iodide maintained at 0–20° C. The mixture is heated under reflux for a further hour, then filtered, and the filtrate is dried and distilled to give a good yield of tetrafluoro-4-iodopyridine.

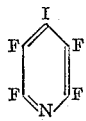

*Example 10.—Preparation of nonafluoro-4-iododiphenyl*

Following the procedure of the previous examples, nonafluoro-4-hydrazino-diphenyl is added gradually to a vigorously stirred suspension of a 25% excess of silver oxide in a 10 molar excess of methyl iodide. The mixture is heated under reflux for a further 2 hours, then filtered. The filtrate is dried, the excess of methyl iodide is removed by distillation, and the residue is recrystallized to give a good yield of nonafluoro-4-iododiphenyl

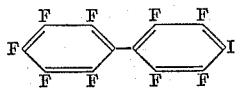

It is to be understood that the foregoing description and specific embodiments are intended to be illustrative of the invention and that variations and modifications in addition to those specifically disclosed are included within the scope of the invention.

We claim:

1. A method for preparing polyfluorinated aryl halides which comprises the step of contacting in the presence of an oxidizing agent a polyfluorinated aryl hydrazine having the formula $$R—NHNH_2$$

where R is selected from the class consisting of carbocyclic aromatic radicals, containing a six membered ring having 3 conjugated double bonds, said aromatic radical being attached to the hydrazine group through an aromatic ring carbon atom and carrying fluorine on at least half of the aromatic ring positions thereof and the tetrafluoropyridyl radical attached to the hydrazine group through a pyridyl ring carbon atom, with an alkyl halide having from 1 to 10 carbon atoms of the formula $$R'—X$$

where X is a halogen atom selected from the group consisting of iodine, bromine and chlorine and where R' is selected from the class consisting of alkyl and haloalkyl radicals.

2. A method in accordance with claim 1 in which said aryl hydrazine is pentafluorophenylhydrazine.

3. A method in accordance with claim 1 in which said aryl hydrazine is tetrafluoropyridyl hydrazine.

4. A method in accordance with claim 1 in which R' is haloalkyl.

5. A method for preparing perfluorinated aryl halides which comprises the step of contacting in the presence of an oxidizing agent at a temperature of —30° C. to +180° C., a perfluorinated aryl hydrazine having the formula R—$NHNH_2$, where R is a perfluorinated carbocyclic aromatic radical containing a six membered ring having three conjugated double bonds, said aromatic radical being attached to the hydrazine group through an aromatic ring carbon atom, with an alkyl halide of the formula R'—X where X is a halogen atom selected from the group consisting of iodine, bromine and chlorine and where R' is selected from the class consisting of alkyl and haloalkyl radicals having from 1 to 10 carbon atoms.

6. A method in accordance with claim 5 in which X is iodine.

7. A method for preparing perfluorinated phenyl halides which comprises the step of contacting in the presence of an oxidizing agent at a temperature of —30° C. to +180° C. a perfluorinated phenylhydrazine with an alkyl iodide of the formula R'—I where R' is selected from the class consisting of alkyl and haloalkyl radicals having from 1 to 10 carbon atoms.

8. A method in accordance with claim 7 in which said oxidizing agent is a heavy metal oxide.

9. A method in accordance with claim 7 in which said alkyl iodide contains from 1 to 3 carbon atoms.

References Cited by the Examiner

UNITED STATES PATENTS

| | | | |
|---|---|---|---|
| 2,361,590 | 10/1944 | Biggs | 260—650 |
| 2,361,591 | 10/1944 | Biggs | 260—650 |
| 2,861,984 | 11/1958 | Gordon et al. | 260—650 |

OTHER REFERENCES

FIAT Final Report 998 (PB 77670), pages 1–5, March 31, 1947.

WALTER A. MODANCE, *Primary Examiner.*

JOHN D. RANDOLPH, *Examiner.*